No. 689,036. Patented Dec. 17, 1901.
H. J. BUELL.
NUT LOCK.
(Application filed Feb. 25, 1899.)

(No Model.)

WITNESSES:
Horatio S. Harrod.
William H. Stoffenbach

INVENTOR:
Harry J. Buell.

UNITED STATES PATENT OFFICE.

HARRY J. BUELL, OF INDIANAPOLIS, INDIANA, ASSIGNOR TO HIRAM NORRIS AND ALICE C. BRADSHAW, OF INDIANAPOLIS, INDIANA, AND GEORGE W. HARROD.

NUT-LOCK.

SPECIFICATION forming part of Letters Patent No. 689,036, dated December 17, 1901.

Application filed February 25, 1899. Serial No. 706,796. (No model.)

*To all whom it may concern:*

Be it known that I, HARRY J. BUELL, a citizen of the United States, residing at Indianapolis, in the county of Marion and State of Indiana, have invented certain new and useful Improvements in Nut-Locks; and I do hereby declare the following to be a full, clear, and exact description of the invention, such as will enable others skilled in the art to which it appertains to make and use the same.

This invention relates to improvements in nut-locks, and particularly with reference to the interlocking forms of washers and pawls, whereby the screw-nut may be prevented from being accidentally reversed and loosened on the threads of bolts to which it may be applied, the devices being particularly applicable to railway-joint bolt-nuts.

The object of the invention is to so construct devices of this character as to be efficient without requiring constant care, reliable and durable, and which may be cheaply produced.

The invention consists in improvements in the forms and application of the ratchet-teeth on the main washer, in the forms of the pawls on the secondary washer, and in the application of the pawls to the ratchet-teeth.

Figure 1:
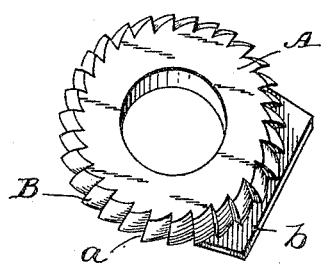
Figure 2:
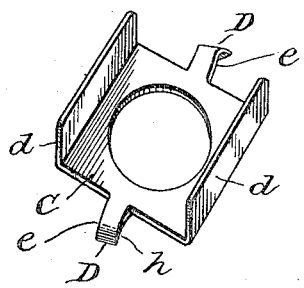
Figure 3:
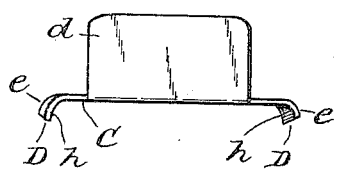
Figure 4:
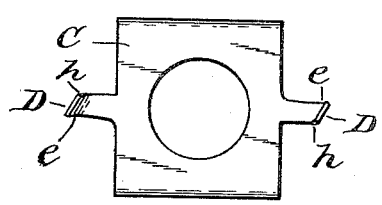
Figure 5:
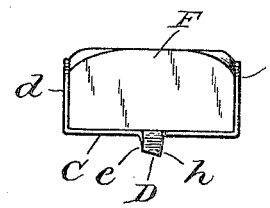
Figure 6:
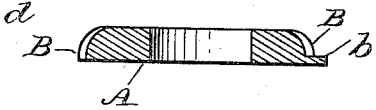
Figure 7:
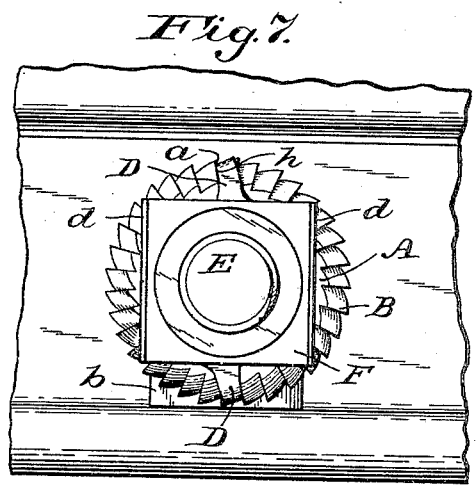
Figure 8:
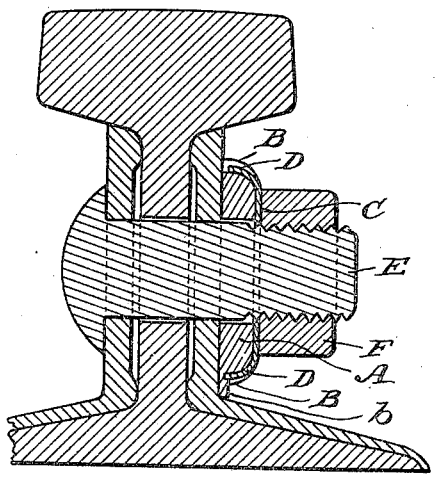

Referring to the drawings, Figure 1 is a perspective view of the main washer constructed substantially according to my invention by which the nut is to be locked by means of a secondary washer having a pawl; Fig. 2, a perspective view of the secondary washer having two pawls for engagement with the main washer and also having flanges to engage the nut; Fig. 3, a side elevation of the secondary washer, showing the twisted pawls thereof; Fig. 4, a bottom plan of the secondary washer; Fig. 5, a side view of a nut to which the secondary washer is connected; Fig. 6, a central sectional view of the main washer; Fig. 7, a fragmentary side elevation of a railway-rail near a joint, showing a joint bolt and nut and also a splice-bar to which the invention is applied as in operation; and Fig. 8 is a transverse vertical sectional view showing the rail, splice-bars, joint-bolt and nut, and the nut-locking washers all in operative positions connected together.

Similar reference characters in the several figures indicate similar parts.

In construction the main circular metallic washer A, having a central bolt-hole, has also a rounded outer corner at the outer face thereof, being in contour a substantially "quarter-round" corner between the outer face and the periphery thereof, and this corner is provided with ratchet-teeth, as B, extending in a circular continuous row of teeth, the operative faces $a$ of the teeth being in lines radiating from the bolt-hole in the washer. The teeth therefore are partly at the front or outer face, project from the periphery, and project partly from the intervening corner between the face and the periphery of the washer, extending transversely across the periphery nearly or quite to the rear face of the washer. The outer and the rear faces of the washer are parallel and planes except as altered by the teeth, and the washer is suitably adapted to be secured to an adjacent or a contiguous object, whereby it may be prevented from rotating about the bolt on which it may be placed. For certain uses the washer has a lip $b$.

The secondary washer C, having a central bolt-hole, is a thin rectangular metal plate, preferably composed of soft spring-steel capable of being cold-pressed, and it is adapted to lie flatwise against the main washer and also to be suitably connected to a screw-nut, as by flanges $d$, and to be turned thereby about the bolt to which it may be applied between the nut and the main washer. The secondary washer C is provided with one or more peculiarly-formed integral spring-pawls D, extending from the body of the washer radially and projecting beyond the nut to which it is designed to be applied. The pawl is of thin flat metal and about equal in width to the space between the operative faces of two adjacent teeth on the main washer A, and the extremity of the pawl is twisted axially and bent over the corner of the front face of the main washer, so as to form a curve corresponding to the curvature of the backs of the teeth, the advancing edge $e$ of the pawl as it swings radially being curved in a longer radius than is the following edge $h$, that is designed to spring down at the fronts of the operative faces *a* of the teeth and be caught thereby against retraction. Thus the elasticity of the pawl is exercised in both longitudinal and transverse directions thereof, and while stiff and reliable will easily be forced to ride over the teeth of the main washer when tightening the nut on the bolt, but cannot be retracted or reversed except by forcibly releasing the pawl from a tooth by means of a prying implement.

The drawings show a lip *b* projecting from the main washer A, whereby to prevent rotation thereof, and they also show flanges *d*, attached to the secondary washer C, whereby to cause the washer to be carried rotatively by and with the bolt-nut; but these old devices may be discarded and others substituted for attaining the desired results.

In operation, a bolt E having been placed in position, the main washer A will be placed thereon so that the teeth thereof will show at the front. Then the secondary washer B may be placed upon the bolt or it may be connected to the nut F for the bolt, and as the nut is screwed down or "home" in the usual manner the pawls D will be brought into contact with and first ride the sloping backs of the teeth B until the nut may be tight, when the following edge of the pawl will spring into engagement with the acute-angled operative face *a* of a tooth, and thereby be prevented from being reversed and preventing the nut from being reversed in motion, and should jarring cause the nut to become very slightly loose and tend to unscrew it from the bolt the pawl will thereby be forced into closer engagement with the tooth by reason of the twisted form of its extremity and the more effectually preventing further rotation of the nut.

Having thus described my invention, what I claim as new, and desire to secure by Letters Patent, is—

1. In a nut-lock, a washer having a rounded outer corner at the periphery thereof provided with projecting teeth extending radially across the rounded corner and also projecting from the periphery of the washer, means for preventing rotation of the washer, a pawl operating in connection with said teeth, and means for connecting the pawl with a nut, in combination with the bolt and the nut having screw-threads operating together.

2. In a nut-lock, a secondary washer provided with a pawl having parallel flat faces projecting therefrom and twisted axially and bent over at its extremity so that its advance edge in operation shall be curved in a longer radius than that of its following edge, means whereby said washer may be connected with a bolt-nut for operating the pawl, and a fixed main washer having ratchet-teeth operating with said pawl, in combination with the bolt and the nut having screw-threads operating together.

3. In a nut-lock, the combination of the bolt and the nut operating together, the main washer having the rounded outer corner at the periphery thereof provided with projecting teeth extending across the rounded corner and also projecting from the periphery of the washer, means for preventing rotation of said washer, the secondary washer provided with a pawl having parallel flat faces projecting therefrom and twisted axially and bent over at its extremity so that its advance edge in operation shall be curved to conform to the longer radius of the higher part of one of said teeth and so that its following edge shall be curved to conform to the shorter radius of the lower portion of the back of one of said teeth, and means whereby said secondary washer may be connected to the nut whereby to operate said pawl in connection with said teeth, substantially as set forth.

In witness whereof I have hereunto set my hand and seal this 13th day of January, A. D. 1899.

HARRY J. BUELL. [L. S.]

Witnesses:
J. R. ROUTH,
JACOB KROPP.